US008949103B2

(12) United States Patent
Brewis et al.

(10) Patent No.: US 8,949,103 B2
(45) Date of Patent: Feb. 3, 2015

(54) PROGRAM CODE SIMULATOR

(75) Inventors: Deon Brewis, Redmond, WA (US);
Durham Goode, Bellevue, WA (US);
John Joseph Jordan, Kirkland, WA (US); Sadi Khan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 12/433,908

(22) Filed: May 1, 2009

(65) Prior Publication Data

US 2010/0281240 A1    Nov. 4, 2010

(51) Int. Cl.
*G06F 9/45*    (2006.01)
*G06F 11/36*    (2006.01)

(52) U.S. Cl.
CPC ........ *G06F 11/3612* (2013.01); *G06F 11/3692* (2013.01); *G06F 11/3696* (2013.01)
USPC .......................................................... 703/22

(58) Field of Classification Search
USPC ...................... 712/233, 234; 703/22; 717/135
See application file for complete search history.

(56) References Cited

U.S. PATENT DOCUMENTS

| | | | | |
|---|---|---|---|---|
| 5,574,854 A | * | 11/1996 | Blake et al. | 714/28 |
| 5,790,778 A | * | 8/1998 | Bush et al. | 714/38.1 |
| 6,463,582 B1 | | 10/2002 | Lethin et al. | |
| 6,684,359 B2 | | 1/2004 | Noy | |
| 6,825,843 B2 | * | 11/2004 | Allen et al. | 345/522 |
| 7,032,216 B1 | | 4/2006 | Nizhegorodov | |
| 7,370,360 B2 | | 5/2008 | van der Made | |
| 7,475,394 B2 | | 1/2009 | Calder et al. | |
| 2002/0049865 A1 | * | 4/2002 | Charnell et al. | 709/315 |
| 2003/0016206 A1 | | 1/2003 | Taitel | |
| 2003/0217248 A1 | * | 11/2003 | Nohl et al. | 712/208 |
| 2004/0194073 A1 | | 9/2004 | Chan et al. | |
| 2006/0026264 A1 | * | 2/2006 | Chesley et al. | 709/218 |

OTHER PUBLICATIONS

Marcuello, Introduction, 2003, TDX.com, p. 6-20.*
Magnusson Peter S. "Efficient Instruction Cache Simulation and Execution Profiling with a Threaded-Code Interpreter", Retrieved at <<http://www.informs-sim.org/wcs97papers/1093.PDF>>, Proceedings of the 1997 Winter Simulation Conference ed. S. Andradóttir, K. J. Healy, D. H. Withers, and B. L. Nelson, pp. 1093-1100.
Romer, et al."The Structure and Performance of Interpreters", Retrieved <<http://www.cs.ucsd.edu/~voelker/pubs/ interp-asplos96.pdf, Sep. 1996, pp. 10.
Buytaert Dries, "A Profiler and Compiler for the Wonka Virtual Machine", Retrieved at <<http://buytaert.net/files/jvm02-abstract.pdf>>, JVM'02, Aug. 2002, pp. 1-2.
BM, "IBM Rational Purify Plus", Retrieved at <<ftp://ftp.software-ibm.com/software/rational/web/datasheets/version6/pplus.pdf>>, May 2007.

* cited by examiner

*Primary Examiner* — Omar Fernandez Rivas
*Assistant Examiner* — Bernard E Cothran
(74) *Attorney, Agent, or Firm* — Kevin Sullivan; Kate Drakos; Micky Minhas

(57) ABSTRACT

A system and method for facilitating simulation of a computer program. A program representation is generated from a computer program. A simulation of the program is performed. Simulation may include applying heuristics to determine program flow for selected instructions, such as a branch instruction or a loop instruction. Simulation may also include creating imaginary objects as surrogates for real objects, when program code to create real objects is restricted, or fields of the objects are unavailable or uncertain, or for other reasons. Data descriptive of the simulation is inserted into the program representation. A visualizer may retrieve the program representation and generate a visualization that shows sequence flows resulting from the simulation.

19 Claims, 10 Drawing Sheets

```
601 namespace ClassLibrary37
602 {
603    public class Class1
604    {
605       void Main()
606       {
607          Class1 instanceA = new Class1();
608          instanceA.Initialize(true);
609
610          for (int i = 0; i < 10; i++)
611          {
612             instanceA.MethodB(i);
613          }
614       }
615
616       void Initialize(bool isNew)
617       {
618          if (isNew)
619          {
620             Class1 cache = new Class1();
621             cache.MethodB(0);
622          }
623       }
624
625       void MethodB(int i) { }
626    }
627 }
```

PROGRAM CODE SIMULATOR

TECHNICAL FIELD

The present invention relates generally to computer programming and compiling, and, more particularly, to simulated execution of computer program code.

BACKGROUND

It is important for software developers and others to understand computer programs, or portions of programs. Various software analysis tools may assist by providing information pertaining to the results of executing a program. One type of tool keeps track of the sequence of instructions that are executed during a program's execution. It may then provide information that indicates which instructions were executed, the number of times each instruction was executed, or the sequence of the executed instructions. A developer may use the output of such a tool to determine whether the program behaved as expected, which parts of the program are the most frequently executed parts, or for other analytic reasons.

Computer programs can be very complex to develop, to debug, and to understand. It is advantageous to developers and others to have tools that assist in understanding programs in a variety of situations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to enable simulation of a computer program in situations in which one or more dependencies are unavailable. In various embodiments, this includes generating a program representation that includes data representative of instructions of the computer program, performing a simulated execution of the computer program, inserting dynamic data descriptive of the control flow into the program representation, and generating a visualization indicative of the control flow.

An example embodiment includes determining a control flow of the program when one or more dependencies are unavailable. A dependency may be a constructor or method that is unavailable, or an object that is unavailable.

An example embodiment includes determining a control flow of a conditional branch instruction based on a conditional branch heuristic, independent of the condition corresponding to the conditional branch instruction. One possible heuristic includes simulating a conditional block, rolling back the effects, and then simulating an else block.

An example embodiment includes determining a control flow of a loop instruction, based on a loop heuristic, independent of the condition corresponding to the loop instruction. One heuristic includes simulating a single iteration of the loop body.

An example embodiment includes creating an imaginary object as a surrogate for an object. This may occur in response to an instruction to instantiate an object, if the object constructor is unavailable or if another object to be passed as an argument to the constructor is unavailable.

An example embodiment includes simulating a method invocation when the invoked method is unavailable. Objects to be passed as arguments may be marked as imaginary. If an object is to be returned from the method, an imaginary object may be created as a surrogate.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
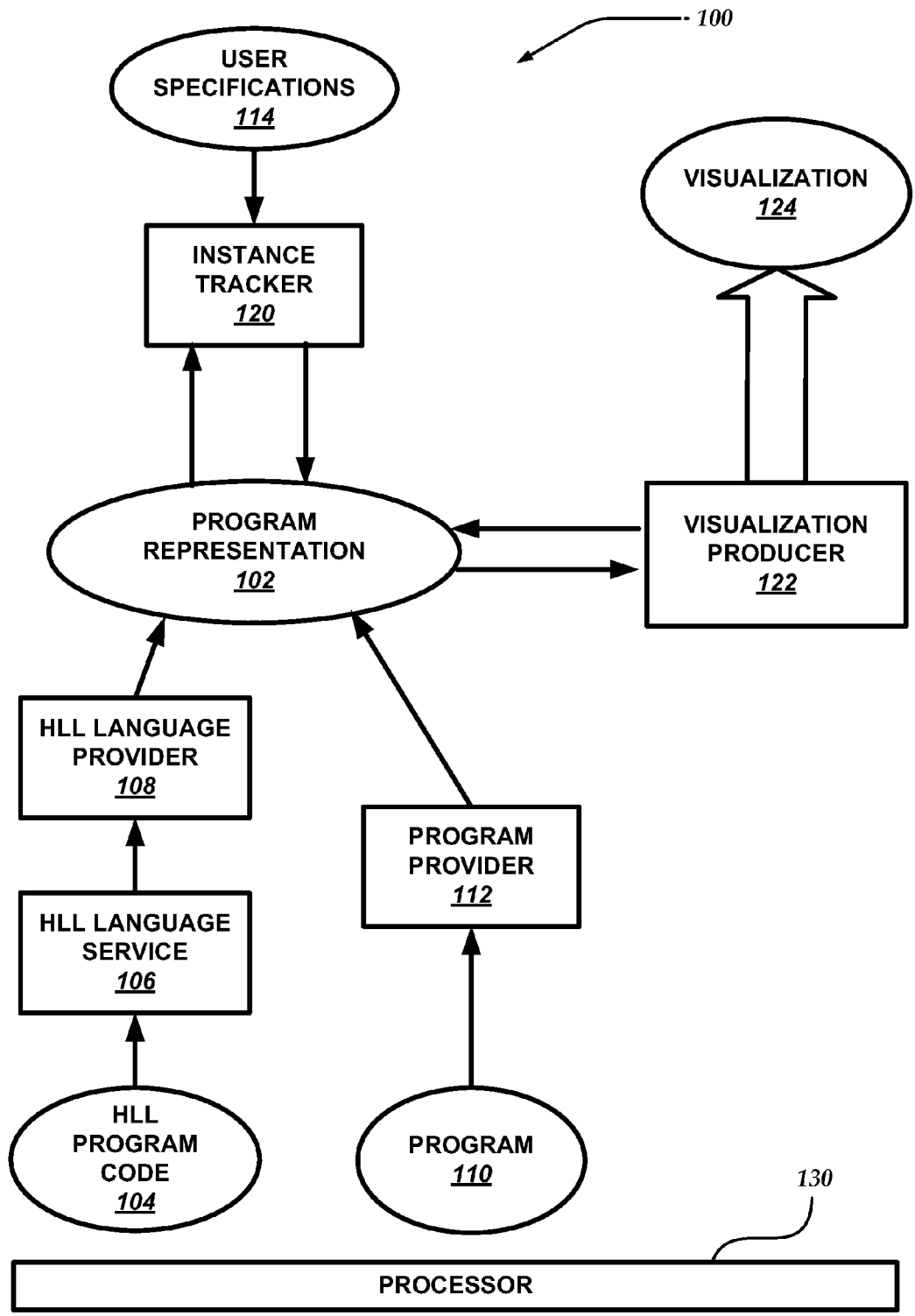
FIG. 1 is a block diagram of a computer system that may employ one or more of the mechanisms herein described.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "computer program" refers to a set of computer instructions, and may be in a high level language, an intermediate language or representation, in a native code, or another format. A portion of a computer program may be considered to be a computer program.

As used herein, the term "program instruction" or simply "instruction" refers to an instruction of a computer program, wherein the instruction may be a high level language instruction, an intermediate level instruction, a native code instruction, or an instruction construct that includes one or more instructions. For example, a loop instruction may include one or more instructions in a loop body; an if-then-else instruction may include a condition, a conditional block, and an else block.

As used herein, the term "method" refers to a portion of code within a computer program that performs a specific task, and can execute relatively independent of other portions of the program. A method may, but does not necessarily, return a value. In various computer languages, different terms may be used, such as subroutine, function, procedure, or subprogram. As used herein, the term "method" may include all of these.

As used herein, the term "branch instruction" refers to a computer instruction that directs a computer to continue execution flow at a "target instruction." A branch instruction may be a conditional branch instruction or an absolute branch instruction. An if-then-else instruction is an example of a conditional branch instruction that includes a conditional block and an else block, each including zero or more instructions.

As used herein, the term "loop instruction" refers to a computer instruction that directs a computer to perform zero or more iterations of a loop body, the loop body including zero or more instructions. A loop instruction may include an explicit or implicit condition, such that the number of iterations is based on the condition. A condition may be expressed as a logical expression, a counter, an enumeration of a set, or in another manner.

As used herein, the term "pointer" refers to a reference to a physical or logical memory location, data structure, program instruction, or program segment. A pointer may be implemented in a variety of ways. It may be used to identify or locate a node of a graph structure.

As used herein, the term "dependency" with respect to a computer program, instruction, or object refers to one or more instructions or one or more objects that are used to execute a method invocation, an object instantiation, an assignment, or other program instructions. For example, an invoked method has a dependency on objects that are passed as arguments; a call instruction is dependent on instructions of the method being called; an object is dependent on the corresponding constructor method and arguments that are passed to the constructor method. A variable or object that is an assignee of an object assignment is dependent on the object that is being assigned.

As used herein, the term "available" with respect to one or more computer instructions refers to a status and indicates that the instructions may be executed or simulated at a particular point in time and a point in execution or simulation of a computer program. For example, a method may be unavailable because the corresponding intermediate or native code is not readily accessible; a method may be unavailable because of a system limitation, such as a limit on a depth of a call stack; a method may be unavailable due to a user-specified restriction specifying an availability of the method. Various other reasons may make a method, or set of one or more instructions unavailable.

As used herein, the term "available" with respect to an object refers to a status and indicates that the object has been created as a real object at a particular point in time and a point in execution or simulation of a computer program when the object is referenced. An object may be unavailable because its constructor is unavailable or a dependency of the constructor is unavailable. An imaginary object that serves as a surrogate for a real object does not make the object "available" as used herein, though it may enable a simulation to proceed.

An imaginary object is an object that is created based on a reference to the object, where at least a portion of code or another object for creating or modifying the object is unavailable. Additionally, as discussed herein, a real object may be converted into an imaginary object in situations in which code that may modify the object is unavailable or an imaginary object becomes a member of the real object.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on computer-readable media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

FIG. 1 is a block diagram of a computer system 100 in which one or more mechanisms described herein may be implemented. FIG. 1 is only an example of a suitable system configuration and is not intended to suggest any limitation as to the scope of use or functionality of the present invention. Thus, a variety of system configurations may be employed without departing from the scope or spirit of the present invention.

As illustrated, the components of FIG. 1 include oval-shaped components that represent a computer program, portions thereof, or related data that may be processed or generated by one or more of the mechanisms described herein. Rectangular components represent computer software, hardware, or logic that performs the actions of one or more of the mechanisms described herein. As illustrated, system 100 includes a program representation 102, which is a representation of a computer program or a portion thereof. In one implementation, program representation 102 is a data structure that may be stored in volatile or non-volatile computer memory or computer storage in one or more blocks, files, or other data objects. In particular, in one implementation, program representation 102 includes a directed graph data structure, in which nodes of the directed graph may represent one or more program instructions, type definitions, objects, frames, or other logical components of a computer program. In one implementation, the directed graph is implemented in a markup language, such as XML. The directed graph markup language (DGML) is one such directed graph specification. DGML is an XML representation of a directed graph, in which each node and link in the graph is a node with properties in the XML.

As illustrated in system 100, the program representation 102 may be generated from source code or other high level representation of program portions. As illustrated, system 100 includes high level language (HLL) program code 104. Examples of a high level language include C-Sharp (C#), Visual Basic, C++, Java, or various other high level languages. A program may include one or more functions. A program may reside in one or more files or other storage representations. A program may include one or more libraries, which may be integrated or distributed in a variety of ways. Thus, HLL program code 104 may represent a program library or a portion thereof.

HLL program code 104 may be processed by HLL language service 106 and HLL language provider 108. HLL language service 106 may receive HLL program code 104 as input and parse the source code. HLL language service 106 may be language specific, such that it includes logic pertaining to a specific high level language. There may be multiple HLL language services, each one corresponding to and processing a particular corresponding language. HLL language services 106 may provide a programmatic interface to HLL language provider 108. HLL language provider 108 may retrieve various components of the program and generate program representation 102. Data added to program representation 102 by HLL language provider may adhere to a designated code schema. Though FIG. 1 illustrates one HLL program code object 104 and a corresponding HLL language service 106 and HLL language provider 108, a system may include multiple HLL program code components, each in a different language, each having a corresponding HLL language service and HLL language provider. In one embodiment, program representation 102 is a representation that is not specific to any language, such that components of different languages may be readily combined.

FIG. 1 illustrates program 110 and a corresponding program provider 112. Program 110 is any computer program or portion thereof, in any of a variety of languages or representations. Program provider 112 may include logic to receive program 110 as input and to generate program representation 102 or portions thereof, in accordance with a code schema. Thus, FIG. 1 illustrates that there are a variety of ways in which program representation 102 may be generated.

As illustrated in FIG. 1, an instance tracker 120 may receive input from, and provide data to, program representation 102. Instance tracker 120 may simulate an execution of the computer program, or a portion thereof, and generate data that indicates an execution path that may result from an execution of the computer program. It may do this by employing a set of heuristics to simulate possible results of an execution of the program instructions. It may also generate "real" objects that represent objects that may be created during a program execution. It may further generate imaginary objects that serve as surrogates for real objects that may be generated during a program execution, in situations where it is preferable to generate such imaginary objects rather than real objects.

Instance tracker may receive one or more user specifications 114 as input. User specifications 114 may include one or more of a specification of a starting point of the program, an ending point, simulation restrictions, or other specifications. Instance tracker 120 may begin at a specified starting point of the program, and traverse the structure of program representation 102. An execution of each program instruction may be simulated, such as with the use of various heuristics, to cause the creation of objects as well as one or more execution code paths. Data generated by instance tracker 120 may be inserted into program representation 102 in accordance with an instance tracking schema. This data may include various dynamic data, such as call frames, branch frames, method calls, or the like. The operation of instance tracker 120 is described in further detail herein.

Figure 5:
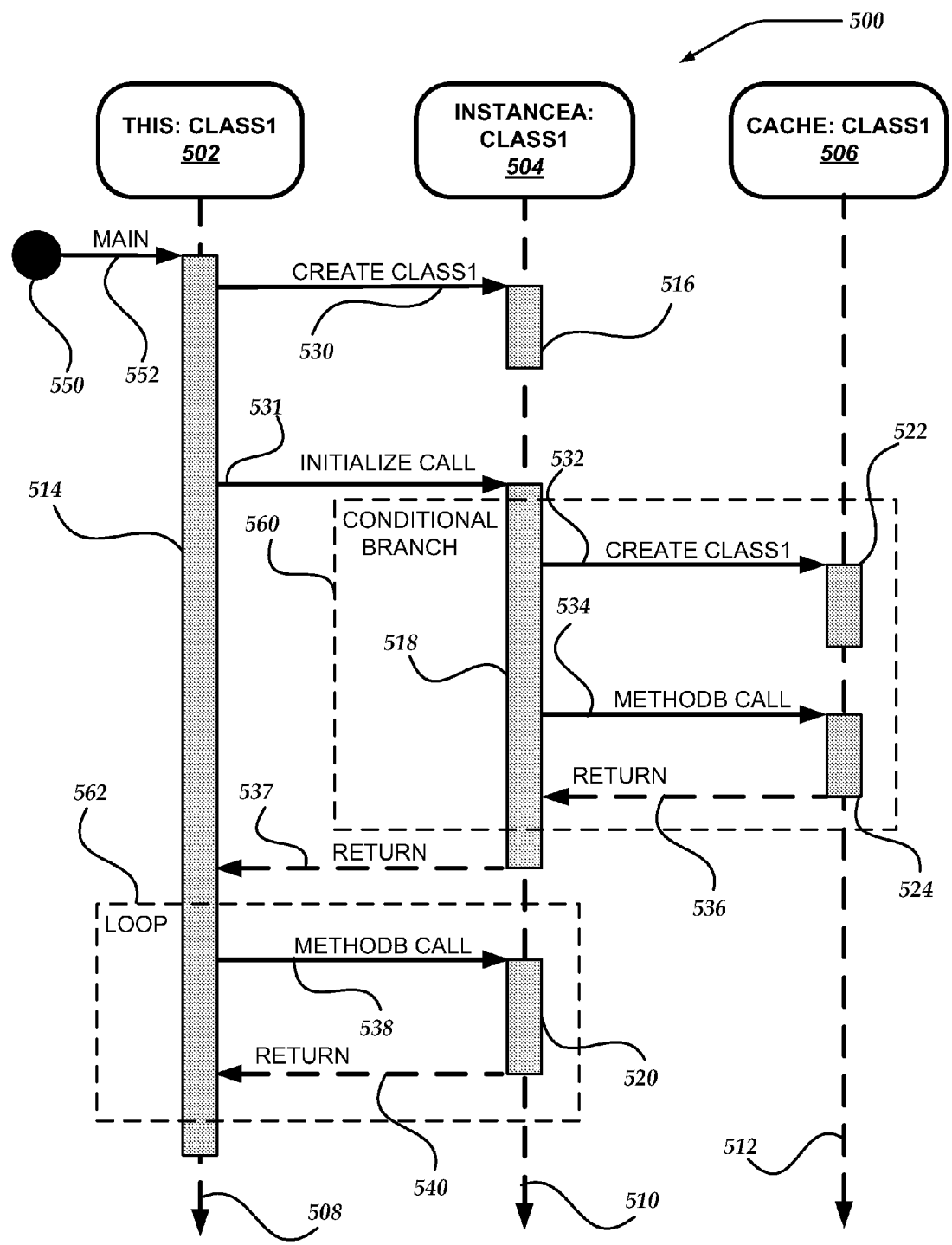
FIG. 5 is an illustration of an example visualization that may be generated by one or more of the mechanisms herein described.
Figure 7:
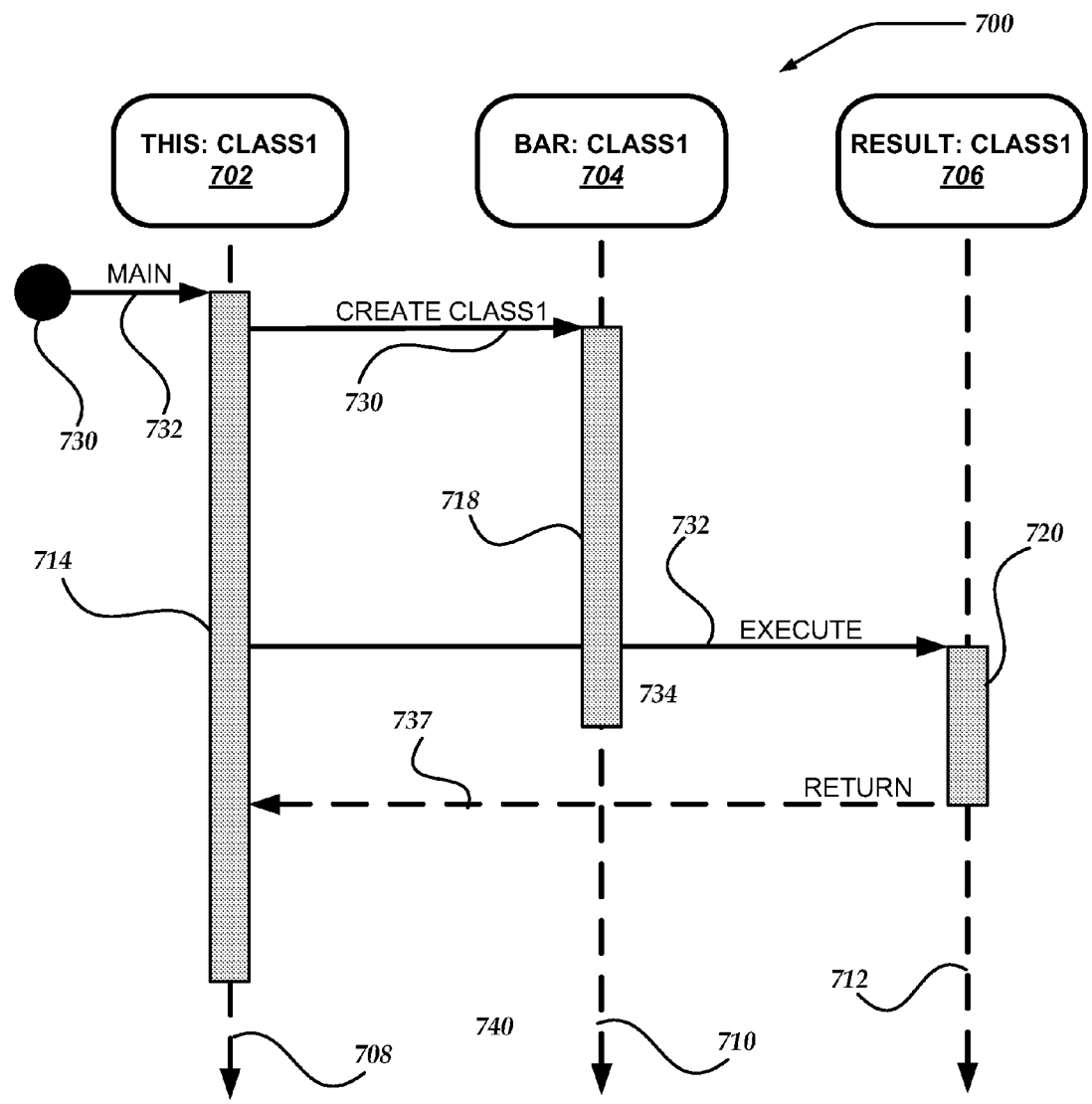
FIG. 7 is an illustration of an example visualization that may be generated by one embodiment.

As illustrated, visualization producer 122 may retrieve data from program representation 102, the data including static program data in accordance with a code schema as well as dynamic program data in accordance with the instance tracking schema. Visualization producer 122 may use this data to generate visualization 124, indicative of the simulations produced by instance tracker 120. Visualization 124 may include one or more diagrams, graphics, animations, or a combination thereof that provide static or dynamic information about the computer program, including results of performing a simulated execution. In one implementation, visualization 124 includes one or more sequence diagrams in accordance with the Unified Modeling Language (UML) specifications. FIGS. 5 and 7 and the associated discussion describe examples of visualization 124.

System 100 may be configured on a computing device. In the illustrated embodiment, system 100 includes processor 130, which performs actions to execute program instructions. Processor 130 may execute program instructions of HLL language provider 108, HLL language service 106, program provider 112, instance tracker 120, and visualization producer 122. In one configuration, processor 130 may include one or more central processing units, one or more processor cores, an ASIC, or other hardware processing component and related program logic. In one configuration, processor 130 may include a software component simulating a hardware processing unit. In one configuration, processor 130 may include a multi-threaded processor, enabling system 100 to be implemented with multiple concurrent threads. For example, instance tracker 120 may operate in a first thread, inserting data into program representation 102, while visualization producer 122 operates concurrently in a second thread, retrieving data from program representation 102.

System 100 may be a subsystem of a development system. A development system may include one or more computing devices that are used by a program developer or a user as part of a program development, testing, or documentation process. The components of system 100 may reside on a single computing device or be distributed among multiple computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like.

A computing device may be a special purpose or general purpose computing device. In brief, one embodiment of a computing device that may be employed includes one or more processing units, a mass memory, and a communications interface. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., is an example of operating systems that may execute on a computing device of a development system.

Figure 2:
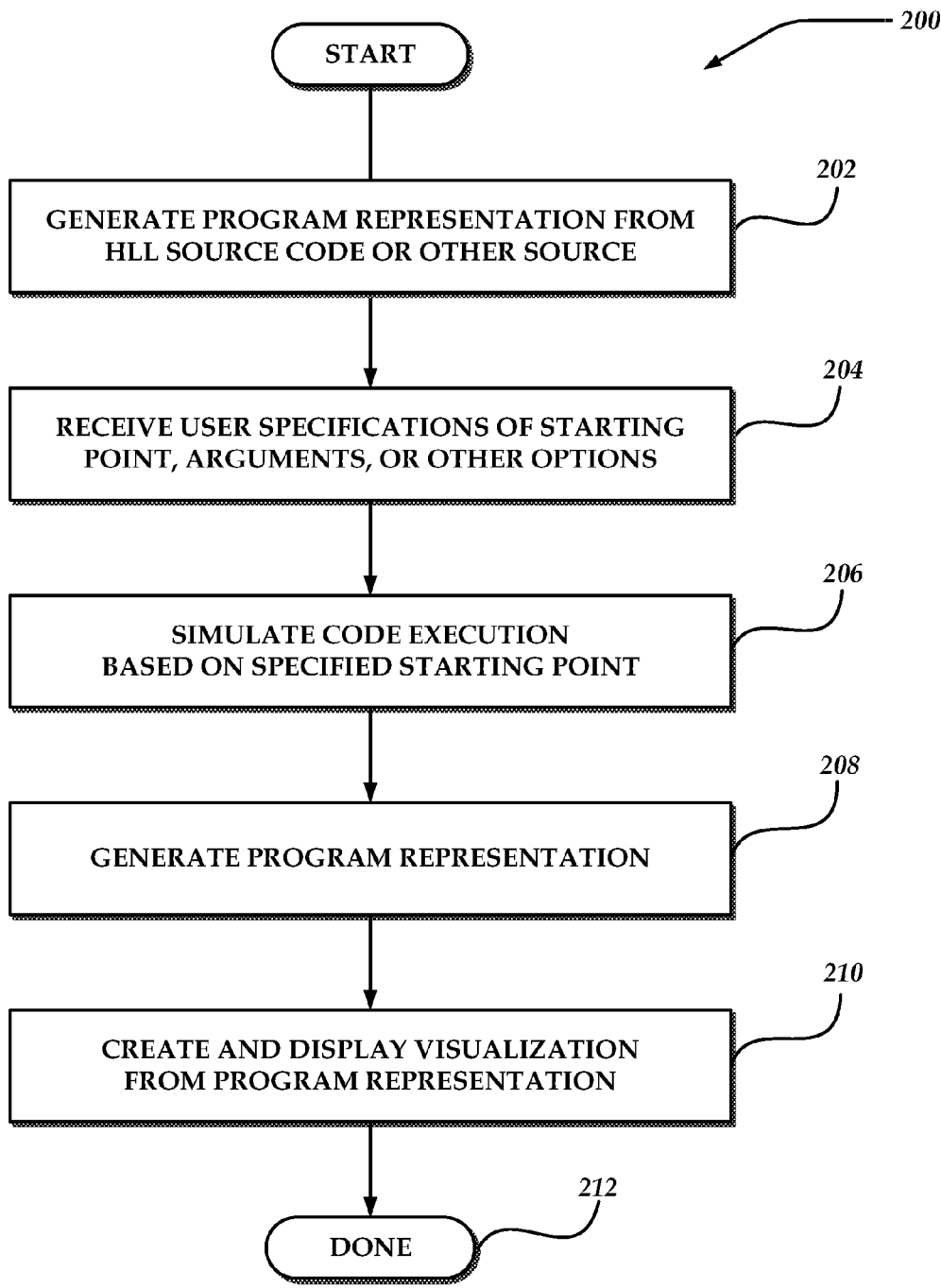
FIG. 2 is a flow diagram illustrating a process for simulating a program execution and generating a visualization, in accordance with an example embodiment.

FIG. 2 is a flow diagram illustrating a process 200 for simulating a program execution and generating a visualization based on the simulation. Process 200 may be performed by components of system 100 of FIG. 1, or a variation thereof.

As illustrated in FIG. 2, after a start block, at block 202, a program representation may be generated from a HLL source code or from another source. This may include parsing the HLL source code and translating the code to an intermediate language representation. As discussed herein, there may be multiple HLL source code modules, and each module may be in the same or in different languages. The program representation may include a directed graph. Program representation 102 of FIG. 1 illustrates a program representation component in the context of system 100.

Process 200 may flow from block 202 to block 204, where the system may receive one or more user specifications. This may include a specification of a starting point, indicating a location in the computer program to begin a program simulation. It may include an ending point to terminate program simulation. The specification may include one or more of a method identification, a class identification, or an instruction identification. The specifications may include a specification of one or more arguments that are to be passed in one or more method calls during the program simulation. The specifications may include identifying a set of one or more assemblies in which the simulation is to be restricted, so that other assemblies are treated as unavailable.

The user specifications may include one or more restrictions on the program simulation. For example, a specification may specify a maximum call stack depth, a maximum number of instructions, or another restriction.

The user specifications may include specifications that control heuristics used during the simulation. In one implementation, this may include a number of iterations that is to be applied to program loops, or to a designated program loop. In one implementation, the specifications may indicate a flow that is to be performed when simulating a conditional branch instruction. User specifications may be received interactively by a provided user interface, by retrieving fields within a file, registry, or other structure, by a signal from another process, or another mechanism. In one embodiment, a user may provide alternative specifications, and the system may generate multiple corresponding results, each of which may be separate or combined.

The process may flow from block 204 to block 206, where a simulated code execution is performed, based on a specified starting point or any other user specifications. One aspect of the simulated code execution is that the simulation may proceed even when data used by the program is unavailable. This may include, for example, an object that is programmed to be instantiated, but the instantiation is not available. In one implementation, such an object may be simulated, by creating an "imaginary" object, thereby allowing the program simulation to continue. Simulation, and the use of "imaginary" objects, is discussed in further detail herein.

Process 200 may flow from block 206 to block 208, where a program representation containing data descriptive of the simulation is generated. In one implementation, this program representation may be combined with the program representation generated at block 202, though in some implementations, it may be a separate program representation. The data added at block 208 may be in accordance with an instance tracking schema. This may include data identifying a sequence of instructions that result, as well as objects that are created, program frames, call stacks, and other dynamic program information. Though the actions of blocks 206 and 208 are shown as separate blocks in FIG. 2, these actions may be performed concurrently. As each instruction execution is simulated, corresponding data may be inserted into the program representation. In one implementation, during the code simulation, data is inserted into the program representation upon certain events, such as simulating conditional branch, loop, method calls, object creation, or other designated instructions.

The process may flow from block 208 to block 210, where a visualization, such as visualization 124, based on the program representation, may be created and displayed. This may be performed by visualization producer 122. A visualization may indicate a sequence, as well as objects that are created. The content of visualizations is described in further detail herein. Some of the actions of block 210 may be performed concurrently with actions of blocks 206 and 208 in a pipeline mechanism, enabling at least a portion of a visualization to be generated concurrently with performance of a simulation and generation of a program representation. The process may flow from block 210 to done block 212, where it may exit or return to a calling program.

Figure 3:
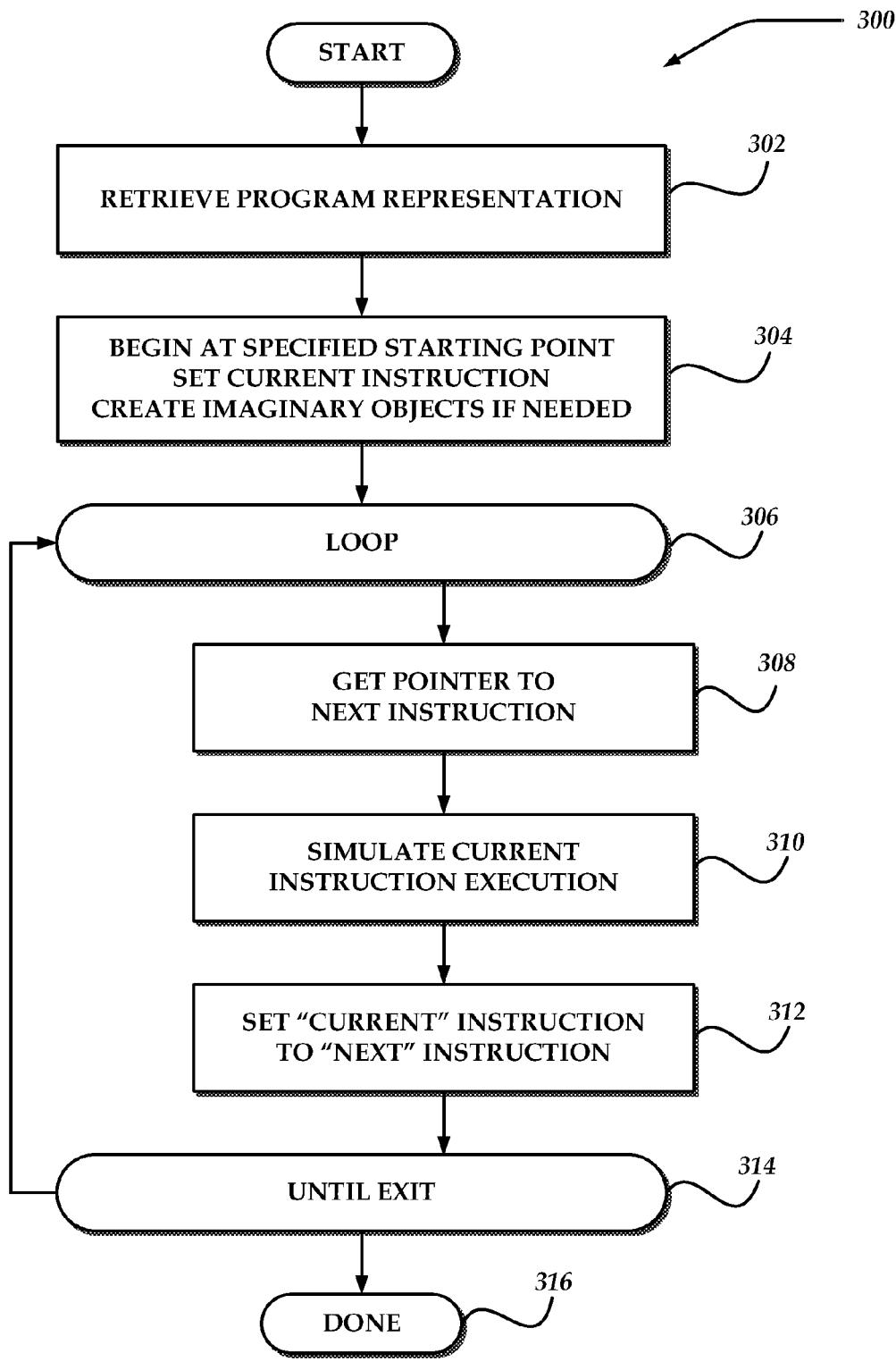
FIG. 3 is a flow diagram illustrating a process for simulating a program execution, in accordance with an example embodiment.

FIG. 3 illustrates a process 300 of simulating a program code execution. Process 300 corresponds to block 206 of FIG. 2, and illustrates, in more detail, the actions of block 206. In one configuration, process 300, or portions thereof, may be performed by instance tracker 120, of FIG. 1.

As illustrated in FIG. 3, after a start block, at block 302, a program representation, such as program representation 102 of FIG. 1, may be retrieved. This retrieval may be implemented in a variety of ways, such as receiving a pointer to the program representation, loading the program representation into memory, receiving a node of the program representation, or another mechanism or a combination thereof.

The process may flow from block 302 to block 304, where a simulation may begin at a specified starting point. The starting point may be specified by a user, as discussed herein. It may be specified in another manner, or be configured as a default starting point. A starting point may reference a program instruction. The actions of block 304 may include setting the first instruction to be the "current" instruction. The current instruction refers to an instruction that is being simulated or is about to be simulated.

The actions of block 304 may include creating one or more "imaginary" objects. An imaginary object is an object that employs heuristics for its creation, for setting one or more of its fields, or for which one or more of its object fields is uncertain. For example, if a starting point for a simulation is within a method that receives one or more objects as arguments, the system may create one or more imaginary objects to be used as surrogates for real arguments. This may be included in the actions of block 304. An imaginary object may be marked as such, in order to distinguish it from real objects. The creation and use of imaginary objects is discussed in further detail herein.

The process may flow from block 304 to loop 306, which indicates a logical looping of one or more iterations. As illustrated, loop 306 is terminated by block 314. Within loop 306, the process may flow to block 308, where a pointer to the next program instruction may be retrieved. The program instruction may correspond to an intermediate level language instruction of the program being simulated. In one implementation, two or more instructions may be grouped together in a block, such that the actions of blocks 308 and 310 are performed on multiple instructions in a single iteration of loop 306.

At block 308, the "next" instruction is an instruction that follows the current instruction, in a sequential sequence. Generally, this is the instruction that will be simulated after the simulation of the current instruction, unless the flow is altered by a branch instruction, method call, method return, exception, or other change of flow, as a result of simulating the current instruction.

Figure 4A:
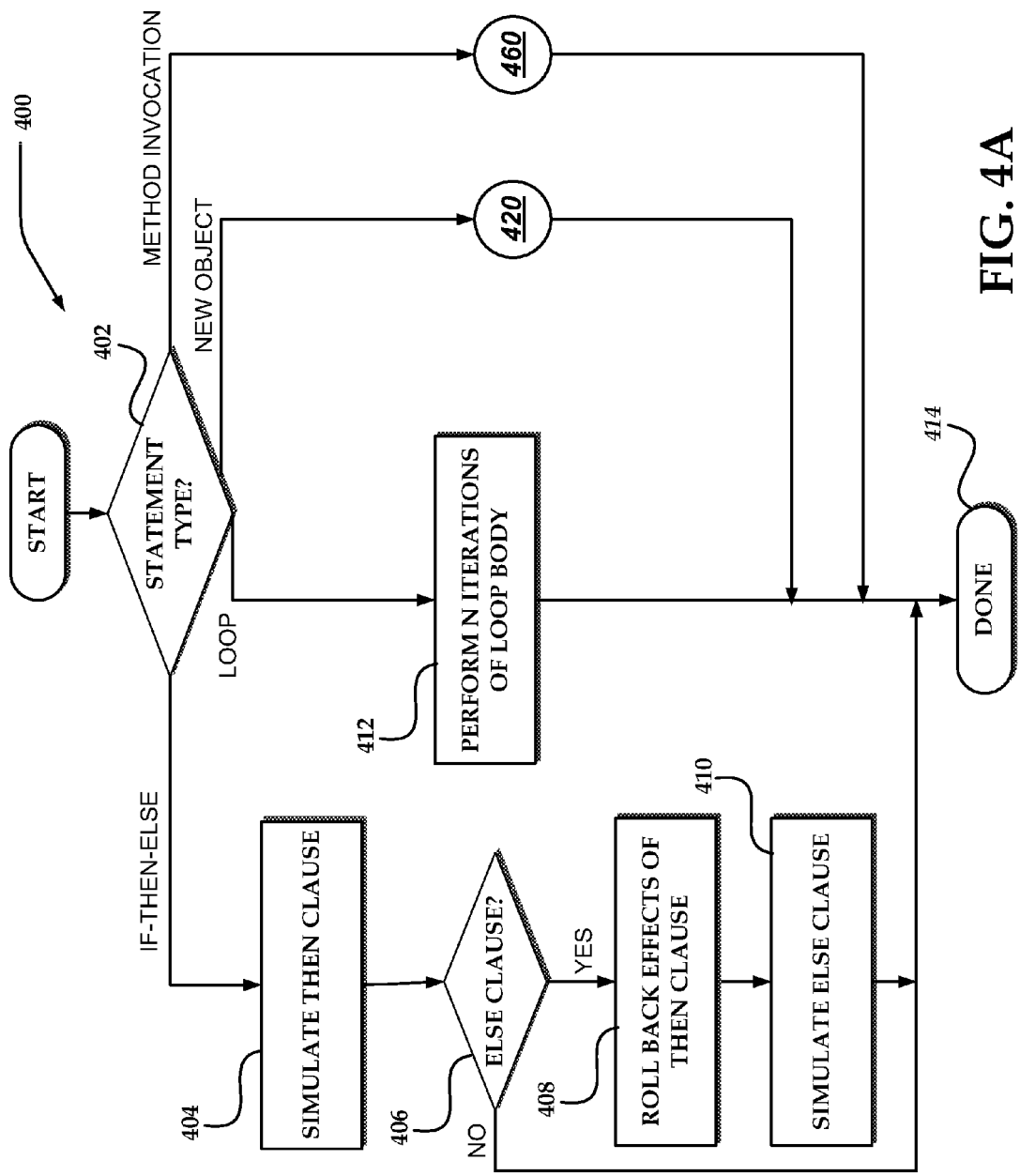
FIGS. 4A-C are flow diagrams illustrating, in more detail, aspects of the process of FIG. 3, in accordance with an example embodiment.
Figure 4B:
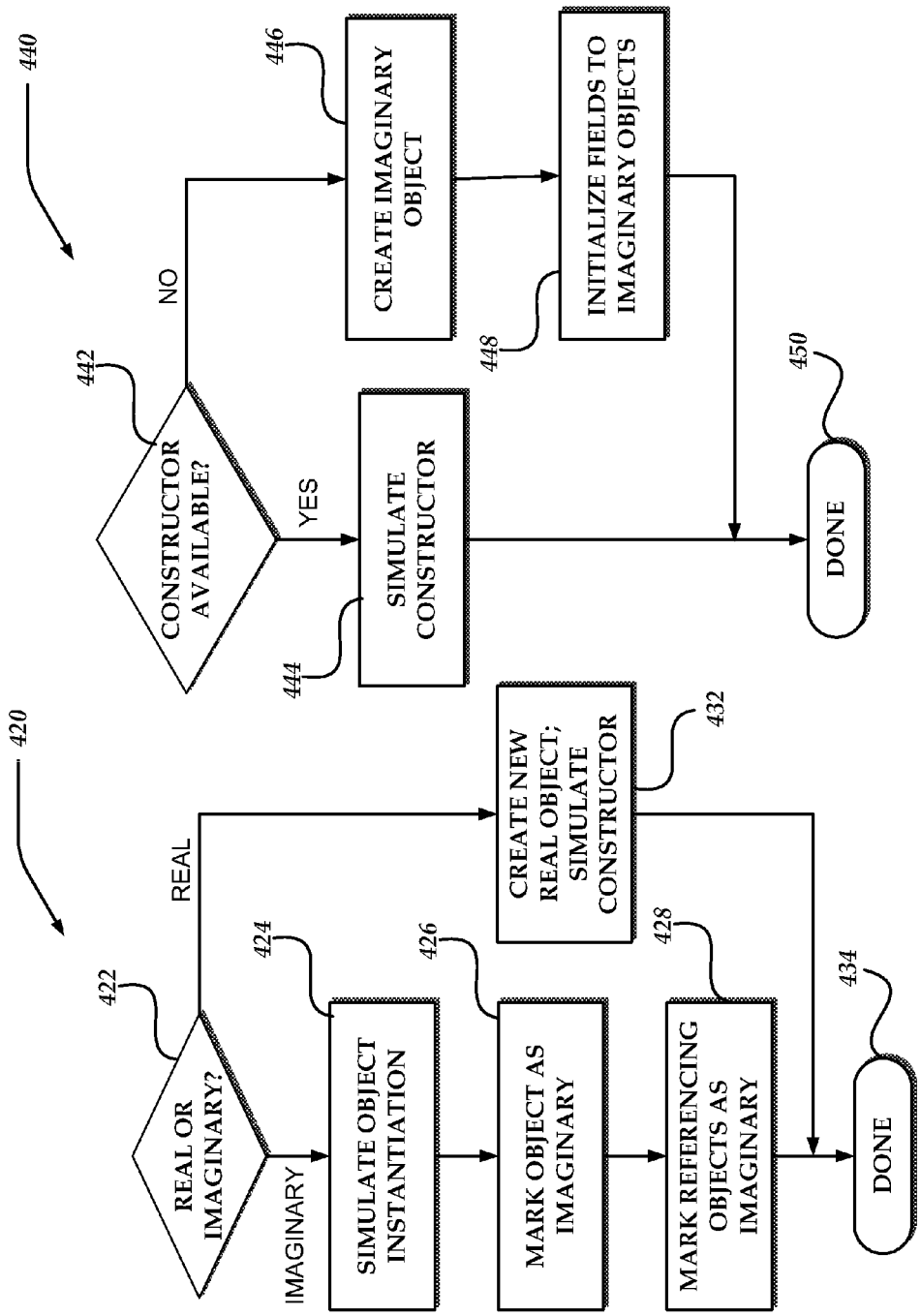
Figure 4C:
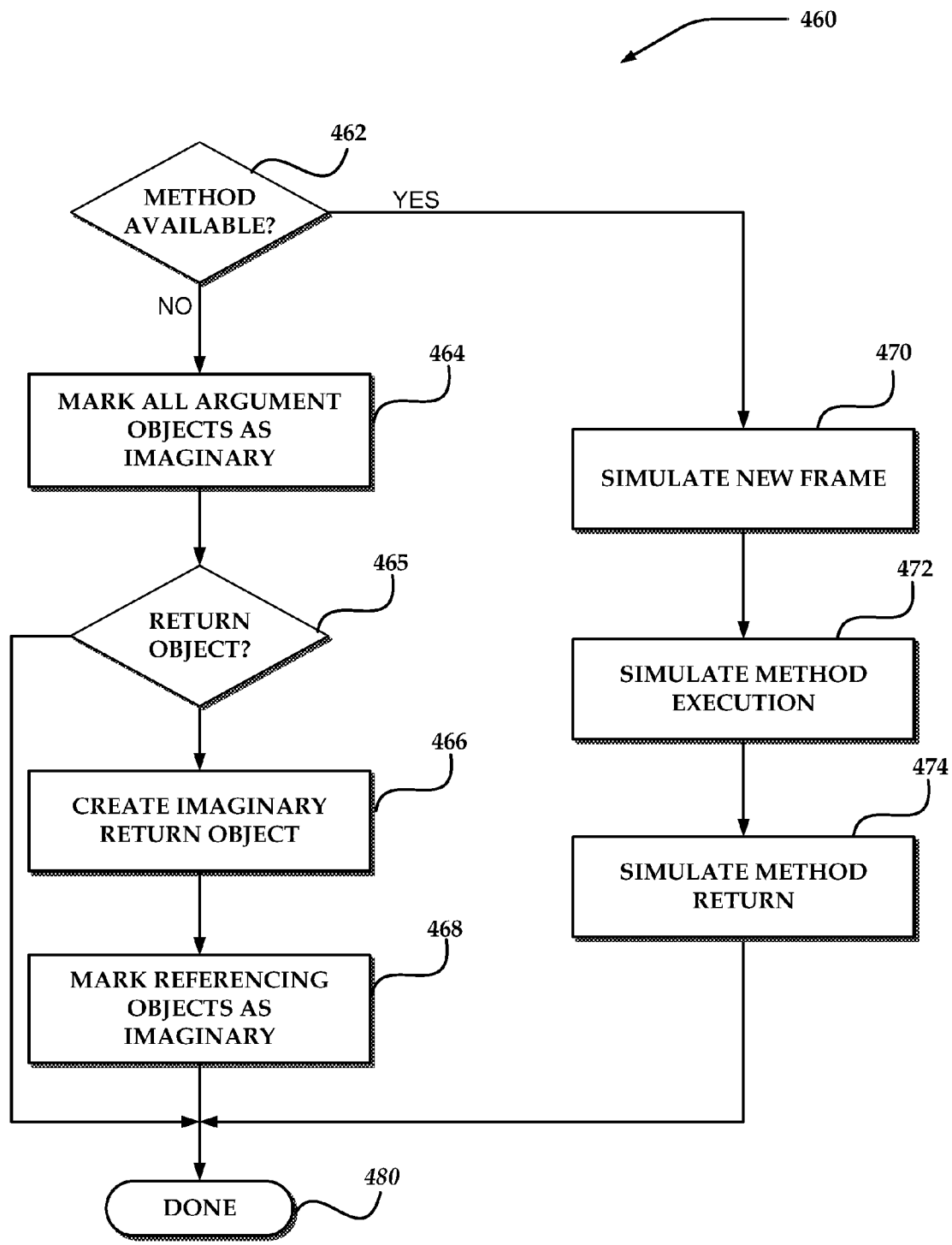

The process may flow from block 308 to block 310, where the current instruction execution is simulated. The simulation of instructions is illustrated in FIGS. 4A-C and described herein. The process may flow from block 310 to block 312, where the "current" instruction is set to the "next" instruction. During the simulation of some instructions, such as a branch instruction or a call instruction, or when an exception occurs, the "next" instruction may be set to an instruction different than that set at block 308, thus implementing the desired flow in the next iteration of loop 306.

The simulated execution of instructions may have other types of side effects. For example, a new real object may be created. If an instruction references an object through a pointer, and it doesn't exist, the object may be created as an imaginary object. Some instructions may modify properties or fields of a real object or imaginary object. Some instructions may cause execution of code contained in the class of a real or imaginary object; this may be tracked as a control flow transfer to the real object or imaginary object instance.

The process may flow from block 312 to block 314, which terminates loop 306. Loop 306 may be iterated one or more times, until the simulation exits. The simulation may exit for any of a variety of reasons, such as completing simulation of the program or program segment, intervention by a user, or other reason. In one embodiment, a user may specify a limit such that the simulation exits when the limit is reached. A limit may specify a stack depth, a number of simulated instructions, or other criteria. In one embodiment, a user may specify a program location that triggers an exit when the location is reached. The process may flow from block 312 to done block 316, where the process returns to a calling program, such as process 200 of FIG. 2.

FIG. 4A illustrates a process 400 for simulating an execution of a program instruction. Process 400 may include some or all of the actions that are performed in block 310 of FIG. 3, and may be performed one or more times during the performance of process 300.

As illustrated, after a start block, the process flows to decision block 402, where a determination is made of the current statement type. The processing of four statement types is illustrated by FIGS. 4A-C. A statement may correspond to a node in the directed graph. It may correspond to an intermediate language instruction, or may be at a higher level, and incorporate a construct such as a loop or an if-then-else construct. Statements may be nested. For example a loop or if-then-else construct may contain other statements. For example, an IF-THEN-ELSE node in the directed graph may include pointers to nodes for the conditional, the conditional block, and the "else" block, each of which may point to inner statements. As illustrated, process 400 may flow from block 402 to block 404 if it is determined that the statement is an if-then-else statement.

Blocks 404-410 illustrate a heuristic that may be applied to an if-then-else statement. In this heuristic, at block 404, the conditional block of the construct is simulated. This may be thought of as a recursive invocation of loop 306, though this may be implemented by mechanisms other than recursion. Process 400 may flow from block 404 to decision block 406, where a determination is made of whether the if-then-else statement includes an "else" clause. If there is not an "else" clause, the process may flow from block 410 to a done block 414, and return to a calling program, such as process 300.

If, at decision block 406, it is determined that an else clause exists, the process may flow to block 408, where the effects of simulating the conditional block are rolled back. As an example of rolling back effects, if an object is instantiated within the "then" clause, it may be freed, and references to it may be rolled back to a prior value or to an undefined value. Similarly, variables that are changed by assignments may be rolled back to a prior value, if possible, or to an undefined value, if not. If the conditional block includes one or more method invocations, the effects of the method invocation may be rolled back.

In the illustrated embodiment, process 400 may flow from block 408 to block 410, where the "else" block of the construct is simulated, in a manner similar to the simulation of the "then" clause. If the "else" block includes an "else-if" clause, this may be treated as an if-then-else statement nested within the "else" clause, and processed recursively as described above. Thus, in one embodiment, the effects of simulating an "else" block may be retained, while the effects of simulating the corresponding conditional block are rolled back. The process may flow from block 410 to a done block 414, and return to a calling program, such as process 300.

Though the application of the above-described heuristic may result in the effects of the conditional block being rolled back, in one embodiment, the simulated flow of the program is retained by the insertion of corresponding sequence data in program representation 102. This data may subsequently be used by visualization producer 122 for inclusion in visualization 124. A visualization may thus indicate a flow sequence indicating simulation of both a conditional block and an "else" block of an if-then-else construct, although the effects of simulating the conditional block may have been rolled back.

In one embodiment, when a heuristic such as the one described above is employed, a condition expression of an if-then-else statement that does not have side effects is not evaluated, since the result of the expression is not used. If an expression has side effects, such as a method invocation, the expression may be simulated. In one embodiment, the condition expression is evaluated regardless of whether it has side effects. It is also to be noted that a different heuristic may be employed. For example, one such heuristic may retain the effects of a "then" clause, and simulate an "else" block but roll back its effects. One embodiment may evaluate an expression of an if-then-else statement and, if an actual result can be obtained, simulate only the clause that would result if the statement were executed.

It is to be noted that the heuristics applied to a conditional statement may affect a subsequent control flow. For example, a conditional block or an else block, or both, may assign an object to a variable. The variable may then be used to invoke a method, such that the method invoked is based on which object has been assigned to the variable.

At the decision block 402, the process may flow to block 412 if it is determined that the statement is a loop statement. As discussed, a loop statement may include one or more additional nested statements, as the body of the loop. Block 412 illustrates a heuristic that may be applied to a loop. In this heuristic, a number N of iterations of the loop are simulated, without regard to the condition that may be specified in the program instructions. The number N may be a specification that is provided by a user. It may be specified for all loops in the program, or it may be specified for specific loops, such that different loops may have different associated specifications for N. The number N may be a configuration that is specified by the system without receiving a user specification. In one embodiment, the number N is equal to one, such that one iteration is performed of each loop that is simulated. The process may flow to a done block 414, and return to a calling program, such as process 300.

As for an if-then-else statement, a loop statement may have a corresponding expression. As described above for if-then-else statements, in various implementations, the loop expression may be simulated or not simulated. In one embodiment, if an actual result can be obtained at each iteration, the result may be used to determine when to exit the loop simulation.

As illustrated in FIG. 4A, if, at decision block 402, it is determined that the statement is an instruction to instantiate a new object, the process may flow to process 420, which is illustrated in FIG. 4B. As illustrated in FIG. 4B, in process 420, at decision block 422, a determination is made of whether the object to be instantiated is to be a real object or an imaginary object. As discussed herein, in accordance with one or more of the mechanisms described herein, an imaginary object serves as a surrogate for a real object. It is created in situations where information for creating a real object may be unknown or uncertain. One such situation exists when an object to be passed as an argument to program code for constructing an object is not known or is an imaginary object itself. Another situation exists when the program code for constructing the object is unavailable. This may occur in a situation in which the constructor program code is not within program representation 102 (FIG. 1). This may occur when the constructor program code has been compiled, but is not included within the program representation 102. It may also occur in a situation in which the constructor program code has not been successfully compiled. Thus, the mechanisms of the system enable a program to be simulated in situations where a portion of the program that is being invoked is not included in the system, or is even unable to compile. Another example situation of an unavailable program segment may occur when a system or specified limit is reached. For example, a maximum call stack depth may be specified, such that an invoked constructor program segment is beyond this limit, causing the constructor to be unavailable.

If, at decision block 422, it is determined that the new object is to be a real object, the process may flow to block 432, where a new "real" object is created. It is to be noted that the term "real object" as used herein does not suggest that the object is equivalent to an object that would be created by a true execution of the relative program code, but rather that the fields of the object have non-imaginary values, and are not imaginary objects. The values are not necessarily the values that would be obtained by a true execution. For example, a numerical value may exist, but it is not necessarily a correct numerical value. In one implementation, creating a real object may include allocating a block of memory from the heap and simulating execution of the appropriate constructor. The process may flow to a done block 434, and return to the calling program, process 400.

If, at decision block 422, it is determined that the new object is to be an imaginary object, the process may flow to block 424, where an object instantiation is simulated. This is described in further detail below. The process may flow from block 424 to block 426, where the new object is marked as an imaginary object. This identification may be used in subsequent processes to determine whether a related object is to be imaginary or real. One such action is illustrated in block 428, in which one or more objects that reference this imaginary object may be marked as imaginary. For example, if the current imaginary object is being created as a field in what would otherwise be a real object, the real object becomes an imaginary object. As stated above, other references to an imaginary object may result in a real object being marked as imaginary. The process may flow from block 428 to a done block 434, and return to the calling program, process 400.

Process 440 illustrates, in further detail, the actions of block 424, simulating an object instantiation. As illustrated, at decision block 442, a determination is made of whether a constructor for the object is available. As discussed above, a constructor may be unavailable because the source code has not compiled successfully, or may not even exist. The constructor code may not be included in the system, or may be inaccessible because of a system limit, or for other reasons. If, at decision block 442, it is determined that a constructor is available, the process may flow to block 444, where the program code of the constructor is simulated. This may include performing the actions of loop 306, of FIG. 3, or a portion thereof. The process may flow to a done block 450, and return to the calling program at block 424.

If, at decision block 442, it is determined that a constructor is not available, the process may flow to block 446, where an imaginary object is created. Creating an imaginary object may include allocating a block of memory from the heap, sufficient to accommodate the fields of the object. The process may flow from block 446 to block 448, where each of the fields of the new imaginary object that are defined as objects are themselves initialized to newly created imaginary objects. The process may flow to a done block 450, and return to the calling program at block 424.

Returning to process 400 of FIG. 4A, if, at decision block 402, it is determined that the current statement is a method invocation, the process may flow to process 460, which is illustrated in FIG. 4C. As illustrated in FIG. 4C, in process 460, at decision block 462, a determination is made of whether the invoked method is available. As discussed with respect to object constructors, a method may be unavailable for any of a number of reasons. These reasons may include program code that does not exist, has not compiled successfully, or is not included in the program representation 102. It may also be unavailable due to system or user limits, such as a maximum stack depth.

If it is determine that the invoked method is available, the process may flow to block 470, where a new call frame is simulated. Simulating a new call frame may include one or more of allocating a block to be used as the frame, linking the new frame with the current frame, allocating local variables or allocating arguments to the method.

The process may flow from block 470 to block 472, where execution of the invoked method is simulated. Simulating a method execution may include recursively performing process 300 of FIG. 3, as discussed herein, or a portion thereof. The program representation corresponding to the method may be traversed, and program statements may be simulated.

The process may flow from block 472 to block 474, where a method return may be simulated. These actions may include freeing the frame allocated at block 470, freeing or dereferencing objects, or the like. A method return may include returning an object. A returned object may be a real object or an imaginary object. If the returned object is an imaginary object, objects that reference it may be marked as imaginary. The process may flow to a done block 480, and return to the calling program, process 400.

At decision block 462, if it is determine that the invoked method is not available, the process may flow to block 464. If the method is unavailable, in the illustrated embodiment, at block 464, objects that are designated as arguments to be passed to the method may be marked as imaginary, if they are not already imaginary objects. Since the method is unavailable, the effects of the method, were it executed, may not be known. Therefore, marking the argument objects as imaginary accommodates this situation. In some embodiments, real objects that are passed to an unavailable method may be left as real objects. It may be known that the object being passed is not impacted. For example, a real object passed as a constant parameter may be left as a real object. In another example, a constant member of a C++ class for an object passed through the this pointer may be left as a real object.

The process may flow from block 464 to decision block 465, where a determination is made of whether the invoked method is configured to return an object. If it is, the process may flow to block 466, where an imaginary return object is created. Actions of creating an imaginary object are illustrated in FIG. 4B and discussed herein.

The process may flow from block 466 to block 468, where objects that reference the returned imaginary object are marked as imaginary, if they are not already. The process may flow to a done block 480 and return to the calling program, process 400.

If, at decision block 465, it is determined that the invoked method is not configured to return an object, the process may flow to done block 480 and return to the calling program, process 400.

Figure 6:
FIG. 6 is an example of program source code that may correspond to the example visualization of FIG. 5, in accordance with one or more of the mechanisms herein described.

FIG. 5 illustrates an example visualization 500 that may be produced in accordance with one embodiment. The example visualization 500 is in the form of a Unified Modeling Language (UML) sequence diagram, though a variety of visualization forms may be used. FIG. 6 is a code listing 600 showing an example of program source code that may correspond to the example visualization 500. Lines 601-627 each correspond to a single line of source code of the code listing 600. References to line numbers of code listing are included in the discussion that follows.

Briefly, a sequence diagram shows the interaction of processes and a sequence of the interactions. In a sequence diagram such as example visualization 500, object instances are displayed horizontally, and a sequence of messages, calls, or returns is shown vertically, with time proceeding downward along a vertical dimension.

In visualization 500, three object instances are displayed: "this" instance 502, "instanceA" instance 504, and "cache" instance 506. Lifelines 508, 510, and 512 are shown as arrows descending downward from respective object instances. Lifelines represent increasing time. Superimposed on lifelines 508, 510, and 512 are execution specifications, which indicate processes or objects that live simultaneously. As illustrated, execution specification 514 indicates that "this" instance 502 is alive during the entire simulation of the program segment of FIG. 6. Execution specifications 516, 518, and 520 represent "instanceA" instance 504, and indicate the time intervals during which "instanceA" instance 504 is live. Execution specifications 522 and 524 indicate the time intervals during which "cache" instance 506 is live.

Horizontal arrows represent messages that correspond to object instantiation, method calls, or method returns. The simulation begins at starting point 550. In the example visualization 500, the following sequence is represented. For each event, the message illustrating the event and the corresponding source code line number is provided.

The "Main" object is invoked ("Main" message 552: line 605).

The "InstanceA" object is created ("Create class1" message 530: line 607)

The "Initialize" method is invoked ("Initialize" message 531: line 609)

The "cache" object is created ("Create class1" message 532: line 620).

"MethodB" is invoked ("MethodB" message 534: line 621).

"MethodB" returns ("Return" message 536: line 625).

"Initialize" returns ("Return" message 537: line 623)

"MethodB" is invoked ("MethodB" message 538: line 612).

"MethodB" returns ("Return" message 540: line 625).

Example visualization 500 also includes a "conditional branch" fragment 560, corresponding to the "if" statement at lines 618-622. As illustrated, the instantiation of the "cache" object, an invocation of "MethodB" (line 621), and a return from "MethodB" occur within the conditional branch fragment 560. Example visualization 500 illustrates that the body of the conditional branch has been simulated.

Example visualization 500 also includes a "loop" fragment 562, corresponding to the loop at lines 610-613. As illustrated, an invocation of "MethodB" (line 612) and a return from "MethodB" occur within the loop fragment 562.

TABLE 1 illustrates a program illustrating a possible effect of an unavailable dependency. In an example simulation of the program of Table 1, the namespace containing Class 2 ("SubNamespace") is unavailable. This may be the result of a user specification, the namespace being left out of the program representation, or for another reason. In a simulation in which Class2 is unavailable, the instantiation of the object "foo" may result in creation of an imaginary object of type Class2 that is assigned to "foo." In the subsequent invocation (line 12) of the "FixUpClass" method on the imaginary Class2 object "foo," since Class2 methods are unavailable, a method is not invoked. Instead, an imaginary object is created and assigned to "result." In the subsequent invocation of "Execute" (line 13), the simulator invokes "Execute" on the imaginary object assigned to "result."

TABLE 1

Example Source Code

```
1.  using ClassLibrary;
2.  using ClassLibrary.SubNamespace;
3.
4.  namespace ClassLibrary
5.  {
6.    public class Class1
7.    {
8.      static void Main( )
9.      {
10.       Class2 foo = new Class2( );
11.       Class1 bar = new Class1( );
12.       Class1 result = foo.FixUpClass(bar);
13.       result.Execute( );
14.     }
15.
16.     void Execute( ) { }
17.   }
18.
19.   namespace SubNamespace
20.   {
21.     public class Class2
22.     {
23.       public Class1 FixUpClass(Class1 a)
24.       {
25.         return a;
26.       }
27.     }
28.   }
29. }
```

FIG. 7 illustrates an example visualization 700 that may be generated in accordance with one embodiment. The example visualization 700 is in the form of a UML sequence diagram. It is one example of a visualization that may be produced as a result of simulating execution of the program illustrated in Table 1.

In visualization 700, three object instances are displayed: "this" instance 702, "bar" instance 704, and "result" instance 706. Lifelines 708, 710, and 712 correspond to each object instance, respectively. Execution specifications 714, 718, and 720 also correspond to each object instance, respectively, and indicate the time during which their corresponding instance is live. As illustrated. Horizontal arrows represent messages that correspond to object instantiation, method calls, or method returns. The simulation begins at starting point 730. In the example visualization 700, the following sequence is represented. For each event, the message illustrating the event and the corresponding source code line number in TABLE 1 are provided.

The "Main" object is invoked ("Main" message 732; line 7)

The "bar" object is created ("Create class1" message 734; line 11)

The "Execute" method is invoked ("Execute" message 736; line 13)

"Execute" returns ("Return" message 738; line 16)

It is to be noted that if "SubNamespace" is available and the program is executed, a sequence diagram would show an instantiation of a Class2 object, "foo" (line 10) and a call to "FixUpClass" (line 12). Thus, at least some of the mechanisms described herein enable a program to be simulated with unavailable dependencies, and in some situations, a resulting visualization differs from a visualization that may result from executing the program.

Figure 8:
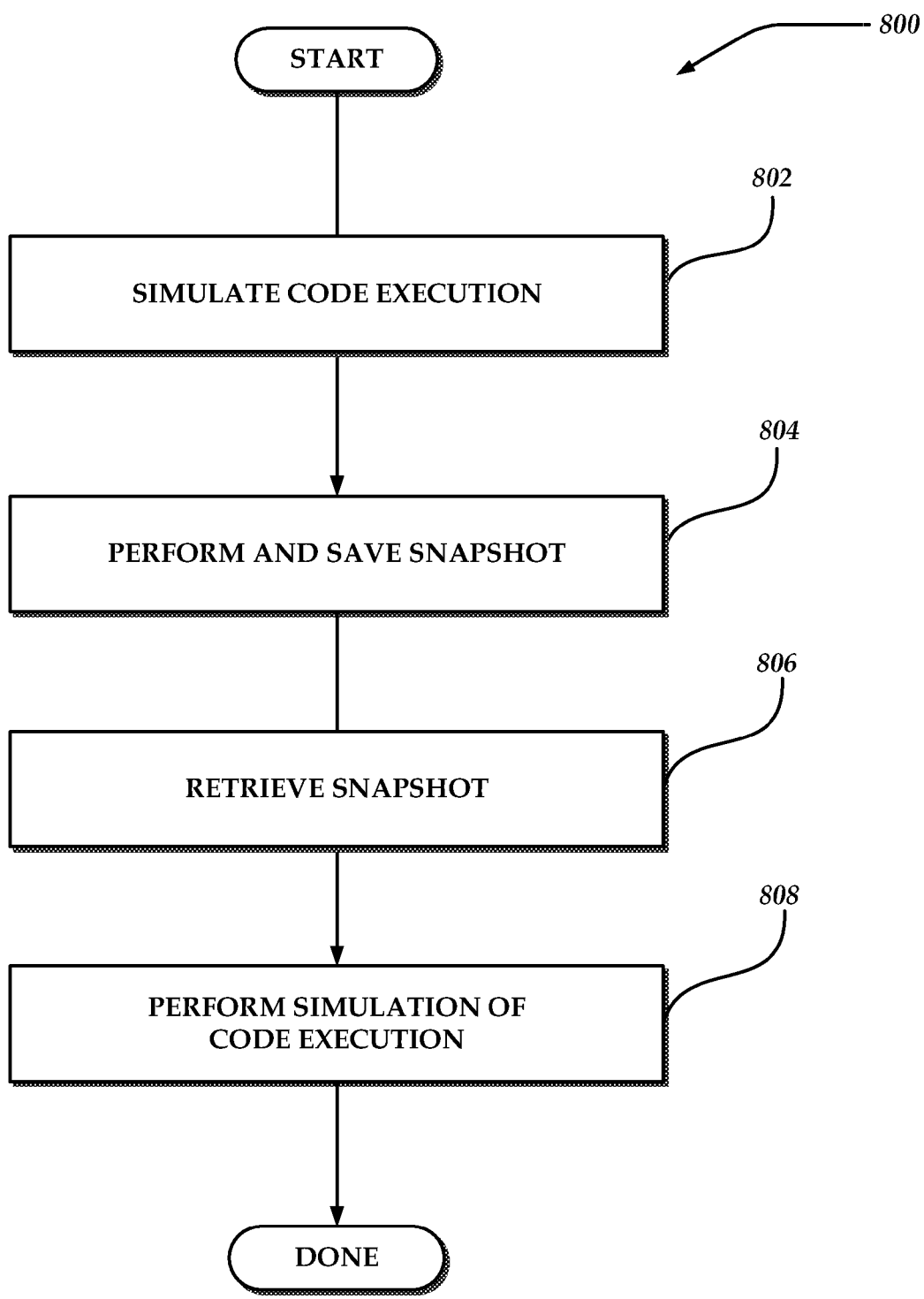
FIG. 8 is a flow diagram illustrating a process of creating and using a snapshot, in accordance with an example embodiment.

FIG. 8 illustrates a process 800 of simulating a program code execution, in which a snapshot is performed and subsequently used. Process 800, or a portion thereof, may be implemented by system 200 of FIG. 2, or a variation thereof. In one configuration, process 200 may be performed by instance tracker 120, of FIG. 1.

As illustrated in FIG. 8, after a start block, at block 802, a simulated code execution is performed. The actions of block 802 may include process 200 of FIG. 2, or a portion thereof. In one implementation, a code simulation may be stopped at a specified location in the program. In one implementation, a code simulation may be stopped in response to a specified event or condition. For example, a maximum call depth may be specified, and the code simulation may automatically stop when the maximum is reached, or an attempt is made to exceed it. Other conditions may also be used to trigger a simulation stopping.

The process may flow from block 802 to block 804, where a snapshot of the system state may be performed. In one implementation, performing a snapshot may include serializing the program representation 102 of FIG. 1. The system snapshot may be saved on computer storage.

The process may flow from block 804 to block 806, where a previously performed snapshot may be retrieved. Though not illustrated in FIG. 8, various actions may be performed between blocks 804 and 808. For example, a user may perform multiple snapshots and then select one to be retrieved at block 806. At block 806, the snapshot may be retrieved from computer storage.

The process may flow from block 806 to block 808, where a simulation of a code execution may be performed, based on the retrieved snapshot. In one implementation, call frames are not included in a snapshot. A simulation may therefore be able to exceed the call depth limit by using a snapshot of a prior simulation, but restarting the call stack. This allows additional calls to be performed, though the simulation may be prevented from returning to a call stack configuration that occurred prior to the snapshot. The actions of block 808 may include process 200, or a portion thereof. Thus, following a simulation based on a snapshot, a visualization may be generated.

In one implementation, a snapshot may be generated from a process other than a code simulation. For example, a debugger or other process may execute a program segment and insert data in accordance with the instance tracking schema. This may be serialized, and then retrieved at block 806, whereupon a code simulation may be performed based on the prior code execution.

It will be understood that each block of the flowchart illustrations of FIGS. 3, 4A-C, and 8 and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method for simulating a computer program execution, comprising:
   a) generating a program representation representing the computer program, the program representation including data representative of a plurality of instructions of the computer program;
   b) performing a simulated execution of the program, the simulated execution comprising:
      i) determining a control flow of the plurality of instructions of the computer program;
      ii) simulating a call instruction that invokes a first unavailable method;
      iii) if an instantiation of a first object is dependent on a second unavailable method or an unavailable second object, creating an imaginary third object as a surrogate for the first object; and
   c) based on performing the simulated execution, inserting dynamic data indicative of the control flow into the program representation.

2. The computer-implemented method of claim 1, the plurality of instructions including a loop instruction with a corresponding condition and a loop body, the simulated execution further comprising simulating a specified number of iterations of the loop body independent of the corresponding condition.

3. The computer-implemented method of claim 1, the plurality of instructions including a conditional branch instruction with a corresponding conditional block of instructions and a corresponding else block of instructions, performing the simulated execution further comprising simulating execution of the conditional branch instruction, simulating execution of the conditional branch instruction comprising simulating instructions of the conditional block and simulating instructions of the else block, the method further comprising generating a visualization indicative of a control flow that includes simulating the conditional block and the else block.

4. The computer-implemented method of claim 1, the plurality of instructions including an instruction to instantiate an object of a class, further comprising selectively creating an imaginary object as a surrogate for the object, based on whether a constructor corresponding to the class is available.

5. The computer-implemented method of claim 1, simulating the call instruction comprising:
   a) if the call instruction passes a real object, marking the real object as imaginary; and
   b) if the call instruction receives a return object, creating an imaginary object as a surrogate for the return object.

6. The computer-implemented method of claim 1, further comprising determining whether a method is the first unavailable method based on whether the program representation includes the method.

7. The computer-implemented method of claim 1, further comprising:
   a) determining whether a call frame stack exceeds a specified maximum size; and
   b) selectively creating an imaginary fourth object as a surrogate for a return object, based on whether the call frame stack exceeds the specified maximum depth.

8. The computer-implemented method of claim 1, the plurality of instructions including a conditional branch instruction-with a corresponding conditional block, the simulated execution further comprising:
   a) simulating instructions of the conditional block; and
   b) rolling back at least one effect of simulating instructions of the conditional block, the at least one effect including an object instantiation.

9. The computer-implemented method of claim 1, further comprising selectively marking a real object as an imaginary fourth object, based on whether the real object references another imaginary object.

10. The computer-implemented method of claim 1, the plurality of instructions including a conditional branch instruction with a corresponding conditional block and a corresponding else block of instructions, performing the simulated execution comprising:
    a) simulating instructions of the conditional block;
    b) rolling back at least one effect of simulating instructions of the conditional block; and
    c) after rolling back the at least one effect, simulating the else block of instructions.

11. A hardware computer-readable storage medium comprising processor executable instructions configured to perform actions comprising:
    a) generating a directed graph program representation representing a computer program having a plurality of instructions;
    b) determining a control flow of the plurality of instructions by traversing the directed graph program representation and performing a simulated execution of the computer program, performing the simulated execution comprising:
       i) in response to determining that an object constructor is unavailable, creating an imaginary first object as a surrogate for the object;
       ii) in response to determining that an invoked method is unavailable, if the invoked method has an associated return object, creating an imaginary second object as a surrogate for the return object;
       iii) determining a control flow of a conditional branch instruction having a corresponding condition, based on a predetermined specification independent of the condition;
    c) inserting dynamic data descriptive of the control flow of the plurality of instructions into the directed graph program representation; and
    d) enabling generation of a visualization indicative of the control flow of the plurality of instructions, based on the directed graph program representation.

12. The hardware computer-readable medium of claim 11, the actions further comprising rolling back at least one effect of simulating a program instruction within a conditional block or an else block of the conditional branch instruction.

13. The hardware computer-readable medium of claim 11, the actions further comprising:
    a) retrieving a snapshot of a previous simulation, the snapshot including a call stack associated with the previous simulation;
    b) inserting data descriptive of the previous simulation into the directed graph prior to determining the control flow of the plurality of instructions; and
    c) simulating a method call by employing the call stack associated with the previous simulation.

14. The hardware computer-readable medium of claim 11, the actions further comprising:
    a) receiving a user specification of a starting point in the computer program;
    b) beginning the simulated execution at an instruction location based on the starting point; and
    c) if the starting point is within a method that has at least one object argument, creating an imaginary object as a surrogate for each object argument.

15. The hardware computer-readable medium of claim 11, the plurality of instructions including a loop instruction with a corresponding condition and a loop body, performing the simulated execution further comprising determining a control flow of the loop instruction based on a loop heuristic independent of the corresponding condition.

16. A computer-based system for simulating execution of a computer program having a plurality of program instructions, comprising:
    a) a mechanism that receives a representation of the computer program;
    b) simulation means for traversing the representation of the computer program and determining a control flow by simulating execution of the plurality of program instructions, comprising computer executable instructions configured to simulate instantiation of an object by selectively creating an imaginary object based on whether a dependency for creating the object is available;
    c) means for storing data representative of the determined control flow;
    and d) a visualization component that generates a visualization representative of the determined control flow, based on the stored data.

17. The computer-based system of claim 16, the program representation including a directed graph, the means for storing data representative of the determined control flow comprising computer executable instructions configured to insert dynamic data into one or more nodes indicative of the control flow into the directed graph.

18. The computer-based system of claim 16, the simulation means comprising means for simulating a call instruction that invokes an unavailable method by creating an imaginary return object.

19. The computer-based system of claim 16, the simulation means comprising means for performing at least one simulation of a conditional branch instruction having a condition expression, a conditional block and an else block, wherein each simulation of the conditional branch instruction includes:
  a) simulating execution of the conditional block;
  b) simulating execution of the else block;
  c) simulating the condition expression if the condition has side effects;
  d) not evaluating the condition expression if the condition expression does not have side effects; and
  e) rolling back at least one effect of simulating the execution of the conditional block or the at least one effect of simulating the execution of the else block.

* * * * *